UNITED STATES PATENT OFFICE.

EDWARD WILLIAM PARNELL AND JAMES SIMPSON, OF LIVERPOOL, COUNTY OF LANCASTER, ENGLAND.

RECOVERY OF AMMONIA IN AMMONIA-SODA MANUFACTURE.

SPECIFICATION forming part of Letters Patent No. 343,675, dated June 15, 1886.

Application filed November 20, 1885. Serial No. 183,437. (No specimens.) Patented in England February 12, 1885, No. 1,937; in France June 2, 1885, No. 169,291; in Germany June 5, 1885, No. 31,122, and in Belgium July 23, 1885, No. 69,760.

*To all whom it may concern:*

Be it known that we, EDWARD WILLIAM PARNELL, of the city of Liverpool, in the county of Lancaster, England, manufacturing chemist, and JAMES SIMPSON, also of Liverpool, alkali-manufacturer, both subjects of the Queen of Great Britain, have invented a new and useful Improvement in the Manufacture of Carbonate of Soda, (for which we have obtained Letters Patent of Great Britain, No. 1,937, February 12, 1885; France, No. 169,291, June 2, 1885; Belgium, No. 69,760, July 23, 1885; Germany, June 5, 1885, No. 31,122, and nowhere else;) and we do hereby declare that the following is a full, clear, and exact description of the invention, which will enable others skilled in the art to which it appertains to make and use the same.

In the manufacture of carbonate of soda by the ammonia process, by which we mean the decomposition of chloride of sodium by means of ammonia and carbonic acid, a considerable expense is incurred by the employment of lime for decomposing the resulting chloride of ammonium, in order that the ammonia may be given off in the free state for repeated use.

The objects of our invention are to dispense with the use of lime for the above purpose, and by employing alkali waste from the Le Blanc process (in which we include drainage from the said waste) and conducting the operation in the manner hereinafter described to recover the ammonia in the free state for repeated use, subject only to moderate loss, and at the same time to produce sulphureted hydrogen in a condition available for the production of sulphur or its compounds.

In carrying our invention into operation we by preference heat a mixture of alkali waste and a solution of chloride of ammonium from the ammonia-alkali process in a closed vessel to a temperature of 212° Fahrenheit, or thereabout, when decomposition takes place, chloride of calcium being formed in solution and vapor consisting successively of sulphureted hydrogen, sulphide of ammonium, and ammonia given off with steam. As these substances combine when brought in contact, forming sulphide of ammonium, we refer to them as one substance—namely, sulphide of ammonium—for the purpose of this specification. Substantially the same results may be obtained by agitating alkali waste and a solution of chloride of ammonium without heat, and subsequently boiling. The sulphide of ammonium so produced will be volatilized or carried off with the steam. The sulphide-of-ammonium vapor produced by either of the foregoing operations is then brought in contact with a solution of acid sulphate of ammonia, sometimes called "bisulphate of ammonia," by any convenient means, such as by passing the said sulphide through a tower, down which the acid sulphate is caused to flow. Ordinary or neutral sulphate of ammonia will be thereby formed with evolution of sulphureted hydrogen. We next concentrate or boil down the solution of neutral sulphate of ammonia so produced in a suitable vessel—say, of lead—and afterward heat the dry sulphate of ammonia produced in a suitable vessel, which may be of cast-iron, till it parts with a portion of its ammonia—say, to the extent of thirty or forty per cent.—which latter is condensed or absorbed in water or brine and used for the production of carbonate of soda by the well-known ammonia process, while the acid sulphate of ammonia which is left behind is drawn off, dissolved in water, and treated or neutralized with a further quantity of sulphate of ammonium till it is again in the condition of ordinary or neutral sulphide of ammonium. This operation may be repeated continuously. The sulphureted hydrogen produced in the foregoing operation may be employed for the manufacture of sulphur or vitriol by any of the well-known methods.

In heating the neutral sulphate of ammonia in order to liberate the ammonia in the free state care should be taken not to raise the temperature too high—say not over 800° Fahrenheit—as a loss would thereby be incurred through the decomposition of the ammonia by heat. In conducting this operation it is advantageous to bring steam in contact with the sulphate of ammonia under treatment, as its presence facilitates the liberation of the ammonia and to some extent equalizes the temperature.

A further part of our invention consists in facilitating the liberation of the ammonia, so as to obtain a larger proportion than thirty or forty per cent. given off on heating with a very slight loss of ammonia, by adding the sulphate of an alkali, which will form an acid sulphate or bisulphate to the sulphate of ammonia before boiling down. For this purpose we recommend sulphate of potash. As this alkaline sulphate serves merely to absorb the acid given off from the bisulphate of ammonia on heating, it is manifest that a given quantity can be used repeatedly.

It is manifest that if a works be designed to manufacture carbonate of soda in about equal quantities by the above process and by the Le Blanc process, respectively, the sulphur required for the latter process may be recovered for repeated use or sale by means of the chloride of ammonium of the former process while the expense of removing the alkali waste is avoided, and an offensive nuisance will be almost obviated. By this arrangement the lime which is produced in the kilns or retorts for supplying carbonic acid to the ammonia-alkali process will be available for the manufacture of bleaching-powder or caustic soda, and if vitriol be made from the sulphureted hydrogen, it can either be sold on account of its purity or employed for the manufacture of sulphate of soda and production of hydrochloric acid.

We are aware that sulphur and lime have been recovered from the tank-waste of the Le Blanc process by the employment of magnesium chloride to decompose the calcium sulphide of the waste, and we make no claim for such process.

We wish it to be understood that we do not claim the production of sulphide of ammonium by heating alkali waste and chloride of ammonium, nor do we claim any improvement in the manner of dealing with sulphureted hydrogen for the manufacture of vitriol or sulphur, for which there are several well-known processes, nor do we limit ourselves to any special modification of the ammonia-alkali process.

Having now particularly described and ascertained the nature of our said invention, and in what manner the same is to be performed, we declare that what we claim is—

1. The process herein described for the recovery of free ammonia and production of sulphureted hydrogen in connection with the ammonia-alkali manufacture, consisting in producing sulphide of ammonium by heating alkali waste with a solution of chloride of ammonium, decomposing the said sulphide of ammonium by means of acid sulphate of ammonia, so evolving sulphureted hydrogen, and heating the neutral sulphate of ammonia till it parts with a portion of the ammonia, leaving acid sulphate of ammonia available for the decomposition of a further quantity of sulphide of ammonium.

2. The process herein described of producing sulphureted hydrogen, consisting in decomposing sulphide of ammonium by means of acid sulphate of ammonia, so evolving sulphureted hydrogen.

3. The process herein described of obtaining free ammonia from sulphide of ammonium, consisting in decomposing sulphide of ammonium by means of acid sulphate of ammonia, so evolving sulphureted hydrogen, and forming neutral sulphate of ammonia, and heating the neutral sulphate of ammonia until it parts with a portion of its ammonia, leaving acid sulphate of ammonia.

4. The process herein described of obtaining free ammonia from neutral sulphate of ammonia, consisting in heating the sulphate of ammonia until it parts with a portion of its ammonia, leaving acid sulphate of ammonia.

5. The process herein described of obtaining free ammonia from neutral sulphate of ammonia, consisting in heating the sulphate of ammonia in the presence of sulphate of potash or equivalent alkaline sulphate until it parts with a portion of its ammonia.

EDWARD WILLIAM PARNELL.
JAMES SIMPSON.

Witnesses:
   EDWD. A. PARNELL,
      13 *Eaton Crescent, Swansea.*
   J. H. HIGHMORE,
      8 *Rumford Place, Liverpool.*